United States Patent
Weerasinghe (10) Patent No.: US 8,217,802 B2
(45) Date of Patent: Jul. 10, 2012

(54) METHODS AND SYSTEMS FOR BOREHOLE TELEMETRY

(75) Inventor: Nalin Weerasinghe, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 621 days.

(21) Appl. No.: 12/364,521

(22) Filed: Feb. 3, 2009

(65) Prior Publication Data
US 2010/0194587 A1    Aug. 5, 2010

(51) Int. Cl.
*G01V 3/18* (2006.01)

(52) U.S. Cl. .................................................. 340/854.9

(58) Field of Classification Search ..... 340/853.1–856.4
See application file for complete search history.

(56) References Cited

U.S. PATENT DOCUMENTS

| | | | |
|---|---|---|---|
| 5,838,727 A | 11/1998 | Lyon et al. | |
| 6,292,559 B1* | 9/2001 | Gaikwad et al. | 379/417 |
| 6,999,517 B1* | 2/2006 | Bombay et al. | 375/257 |
| 7,035,400 B1* | 4/2006 | Gaikwad et al. | 379/417 |
| 2002/0101359 A1* | 8/2002 | Huckaba et al. | 340/854.9 |
| 2003/0086514 A1* | 5/2003 | Ginis et al. | 375/346 |
| 2003/0161412 A1* | 8/2003 | Niida et al. | 375/299 |
| 2003/0165189 A1* | 9/2003 | Kadous | 375/225 |
| 2003/0210750 A1* | 11/2003 | Onggosanusi et al. | 375/295 |
| 2004/0155794 A1* | 8/2004 | Gardner | 340/855.7 |
| 2004/0222901 A1* | 11/2004 | Dodge et al. | 340/854.3 |
| 2006/0176993 A1* | 8/2006 | Kwun et al. | 375/367 |
| 2007/0035812 A1* | 2/2007 | Roller | 359/337.1 |
| 2007/0081582 A1* | 4/2007 | Ginis et al. | 375/222 |

OTHER PUBLICATIONS

S.M. Alamouti, "A simple transmit diversity technique for wireless communications", IEEE Journal on Selected Areas in Communications, 16 (8): 1451-1458, Oct. 1998.
M. Jankiraman, "Space-Time Codes and MIMO Systems," Artech House, 2004.

* cited by examiner

*Primary Examiner* — Jennifer H Gay
*Assistant Examiner* — Blake Michener
(74) *Attorney, Agent, or Firm* — Jianguang Du; Jody DeStefanis; Jeff Griffin (57) ABSTRACT

Methods and systems for borehole telemetry utilizing a tool configured or designed for deployment in a borehole traversing a subterranean formation. The tool includes a downhole telemetry module; a surface telemetry module; and a datalink between the downhole and surface modules configured or designed for transferring data over two or more data communication channels, wherein the transferred data comprises coding at a transmitter to increase the signal to noise ratio (SNR) of the data.

10 Claims, 9 Drawing Sheets

METHODS AND SYSTEMS FOR BOREHOLE TELEMETRY

BACKGROUND

1. Field of the Invention

The present disclosure relates generally to methods and systems for borehole telemetry in surveys relating to subterranean formations. More specifically, some aspects disclosed herein are directed to methods and systems for transmitting data between a borehole tool and a surface system over an electrical cable utilizing multiple data communication channels and data that is pre-coded at the transmitter to improve the reliability of data transfer and achieve a gain merit, in particular, in difficult environments such as borehole logging.

2. Background of the Related Art

Accurate and rapid collection and distribution of geophysical property data is a key to successful exploration and production of petroleum resources. Based on data such as electrical and nuclear properties collected in a wellbore, as well as the propagation of sound through a formation, geophysicists make an analysis useful in making many important operational decisions. The analysis includes determination of whether a well is likely to produce hydrocarbons, whether to drill additional wells in the vicinity of an existing well, and whether to abandon a well as being unproductive.

Measurements of the type described herein are also useful in the fields of $CO_2$ sequestration, development of methane hydrate deposits, water reservoir monitoring, earthquake monitoring, and monitoring for reservoir delineation, among other applications that are known to persons skilled in the art.

Geophysicists may also use wellbore data to select where to set casing in a well and to decide on how to perforate a well to stimulate hydrocarbon flow. One method of collecting wellbore geophysical properties is by way of well logging. In well logging, a logging tool (also often referred to as a sonde) is lowered into a wellbore on and electrical cable, the wireline. The logging tool is an electrically powered measurement device that may, for example, collect electrical data, sonic waveforms that are propagated through the surrounding formation, or radioactivity counts. These measurements are usually converted to a digital form and transmitted on the wireline. Systems for transmitting data from the borehole logging tool to a data acquisition system over a wireline cable are known as wireline telemetry systems.

Commonly owned U.S. Pat. No. 5,838,727 of Schlumberger Technology Corporation discloses one wireline telemetry system. This wireline telemetry system transmits data from the logging tool to the surface computer using a single carrier frequency. Wireline cables are primarily designed for mechanical properties. A modern oil well may be drilled to a depth of in excess of 30,000 feet. The cable must be able to sustain the tension generated from the weight of the logging tools and the weight of the lengthy cable itself.

As discussed above, logging and monitoring boreholes has been done for many years to enhance and observe recovery of oil and gas deposits. In the logging of boreholes, one method of making measurements underground includes attaching one or more tools to a wireline connected to a surface system. The tools are then lowered into a borehole by the wireline and drawn back to the surface ("logged") through the borehole while taking measurements. The wireline is usually an electrical conducting cable with limited data transmission capability. Similarly, permanent monitoring systems are established with permanent sensors that are also generally attached to an electrical cable.

Demand for higher data rates for wireline logging tools and permanent monitoring systems is growing rapidly because of higher resolution sensors, faster logging speeds, and additional tools available for a single wireline string. Although current electronic telemetry systems have evolved, increasing the data transmission rates from about 500 kbps (kilobits per second) to 2 Mbps (megabits per second) over the last decade, data rates for electronic telemetry systems are lagging behind the capabilities of the higher resolution sensors. In fact, for some combinations of acoustic/imagining tools used with traditional logging tools, the desired data transmission rate is more than 4 Mbps.

In addition, while higher data rates are desirable, many tools in current use would have to be completely reworked or replaced to incorporate new data transmission technologies. It would be desirable to facilitate faster data transmission rates with minimal changes to existing tools and equipment.

As a consequence of a need for higher data rates problems in data transmission arise such as degradation of data quality. Therefore, it would be desirable to transfer data between downhole and surface tools with improved signal to noise ratio (SNR) so that the quality of the transferred data is not compromised.

From the foregoing it will be apparent that there is need for improving data throughput in downhole telemetry systems, and to have a telemetry system that is more adaptable to the specific characteristics of the cable that is used to transfer data.

SUMMARY OF THE DISCLOSURE

The disclosure herein may meet at least some of the above-described needs and others. In consequence of the background discussed above, and other factors that are known in the field of borehole telemetry, the applicant recognized the need for methods and systems for transmitting data between downhole tools and surface systems in a reliable, efficient manner. In this, the applicant recognized that techniques were needed that could eliminate, or at least reduce, shortcomings that are inherent in the conventional methods and systems for borehole telemetry, in particular, borehole telemetry systems that utilize discrete multitone modulation ("DMT") type modems.

Applicant recognized that coding techniques may be utilized in borehole telemetry systems to address interference problems that arise when data are transmitted over a wireline type cable. "Downhole tools" and "borehole systems" are used broadly to mean any tool or system used in a subterranean environment including, but not limited to, a logging tool, an imaging tool, an acoustic tool, a permanent monitoring tool, and a combination tool. Aspects disclosed herein include borehole communication systems combined with a plurality of devices attached along a coiled tubing, or a cable line, wire line, slickline, wired drillpipe, or any other suitable downhole deployment means having telemetry capability. For purposes of this disclosure, when any one of the terms wireline, drillpipe, cable line, slickline or coiled tubing or conveyance is used it is understood that any of the above-referenced deployment means, or any other suitable equivalent means, may be used with the present disclosure without departing from the spirit and scope of the present invention.

In some aspects, the present disclosure teaches the use of multi-input multi-output communications ("MIMO") technology, in combination with pre-coding at the transmitter, such as channel coding or singular value decomposition, to derive improved, efficient transmission of data in borehole environments utilizing, for example, wireline cables. The applicant recognized that evolving block coding technology could be advantageously adapted and utilized for data telemetry applications in borehole environments, utilizing, for example, existing data telemetry cable systems, to provide data transmission results that are not possible with presently available techniques and systems. The techniques of the present disclosure utilize a combination of a MIMO DMT system with space-time block coding ("STBC") or singular value decomposition ("SVD") to, among other things, reduce cross talk in data transmission using, for example, wireline cables.

Methods and systems disclosed herein are directed at borehole telemetry systems comprising a tool configured or designed for deployment in a borehole traversing a subterranean formation. In some embodiments of the present disclosure, the tool comprises a downhole telemetry module; a surface telemetry module; and a datalink between the downhole and surface modules configured or designed for transferring data over two or more data communication channels, wherein the transferred data comprises coding to increase the signal to noise ratio (SNR) of the data.

In aspects herein, the coding may comprise space-time block coding (STBC). In some embodiments, the datalink comprises a multi-input multi-output discrete multitone modulation system. In other embodiments of the disclosure herein, the datalink transfers data between the surface and downhole modules via a wireline cable. In yet other embodiments, the wireline cable may comprise a 7 cable heptacable. The wireline cable may provide power to downhole tools. The downhole telemetry module may be connected to at least one tool configured for making measurements while in the borehole, and the datalink may be configured or designed to pass data to and from the tool.

A method for borehole telemetry is provided comprising deploying a tool at at least one depth in a borehole traversing a subterranean formation. The tool comprises a downhole telemetry module and data is transferred over a datalink between the downhole telemetry module and a surface telemetry module. The datalink may comprise two or more data communication channels. The transferred data is channel coded to increase the signal to noise ratio (SNR) of the data.

In aspects of the present disclosure, the channel coding may comprise space-time block coding. In other aspects, the datalink may comprise a multi-input multi-output discrete multitone modulation system.

Additional advantages and novel features will be set forth in the description which follows or may be learned by those skilled in the art through reading the materials herein or practicing the principles described herein. Some of the advantages described herein may be achieved through the means recited in the attached claims.

THE DRAWINGS

The accompanying drawings illustrate certain embodiments and are a part of the specification. Together with the following description, the drawings demonstrate and explain some of the principles of the present invention.

Throughout the drawings, identical reference numbers and descriptions indicate similar, but not necessarily identical elements. While the principles described herein are susceptible to various modifications and alternative forms, specific embodiments have been shown by way of example in the drawings and will be described in detail herein. However, it should be understood that the invention is not intended to be limited to the particular forms disclosed. Rather, the invention includes all modifications, equivalents and alternatives falling within the scope of the appended claims.

DETAILED DESCRIPTION

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment of this invention.

In the logging of boreholes, one method of making measurements underground comprises connecting one or more tools to a cable connected to a surface system. In this, the present disclosure contemplates applications such as wireline, logging-while-drilling, measurement-while-drilling, permanent and/or semi-permanent monitoring, production logging, $CO_2$ and water reservoir monitoring, earthquake monitoring, among others that are known to those skilled in the art in which data telemetry is required. The tools are then lowered into the borehole and then drawn back to the surface ("logged") through the borehole while making measurements. The cable often has multiple conductors, for example, a 7 conductor cable known in the art as a heptacable is common. The conductors of the cable provide power to the tool from the surface and provide a route for electric signals to be passed between the tool and the surface system. These signals are for example, tool control signals which pass from the surface system to the tool, and tool operation signals and data which pass from the tool to the surface system.

Figure 1:
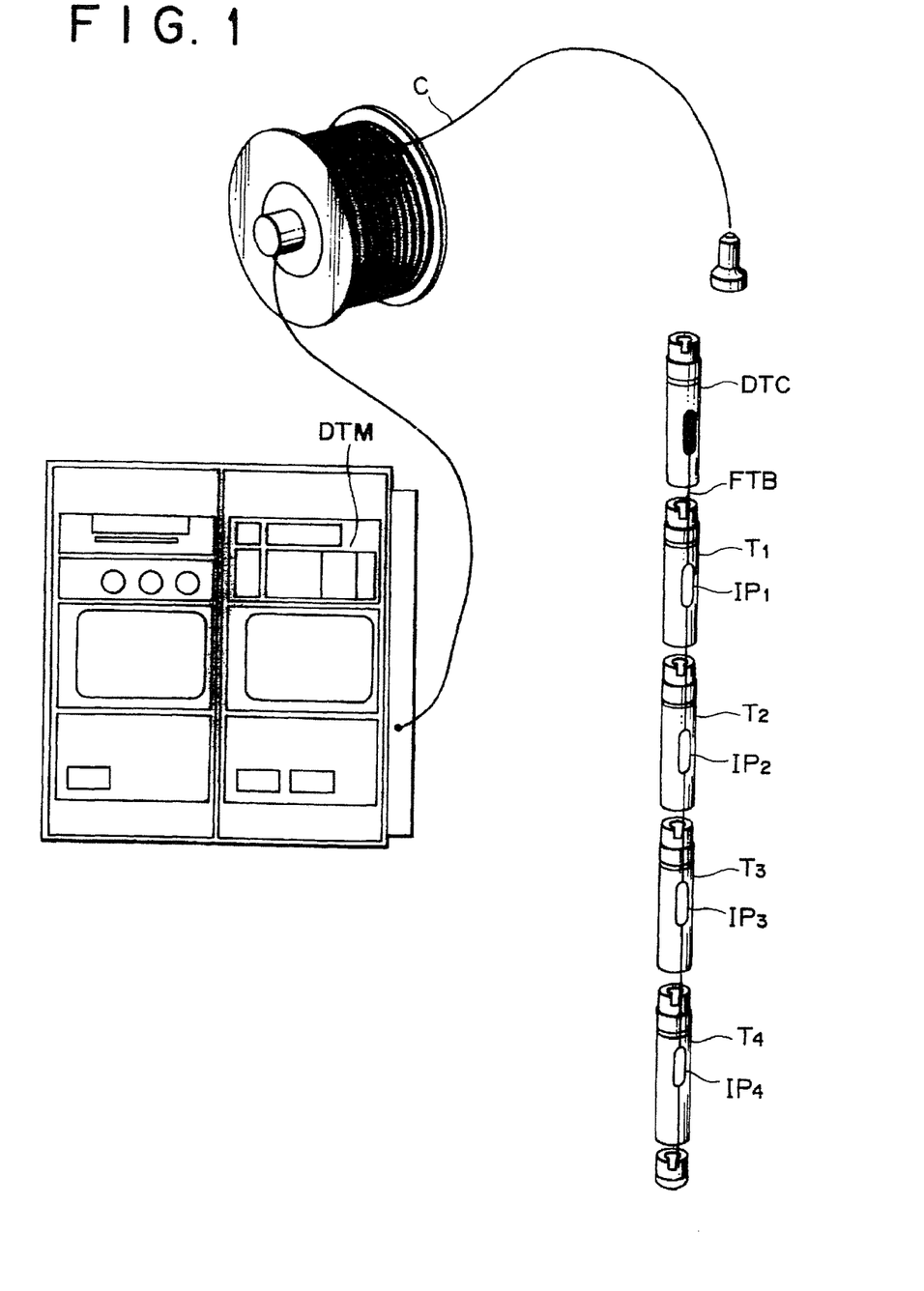
FIG. 1 illustrates schematically one exemplary borehole telemetry system of the present disclosure for monitoring subterranean formations according to the principles described herein.

A schematic view of one possible borehole telemetry system is shown in FIG. 1. The system shown comprises a digital telemetry module (DTM) which is typically located at the surface, a cable C, a downhole telemetry cartridge (DTC) at the head of a tool string which includes a number of downhole tools T1, T2, . . . each containing a respective interface package IP1, IP2, . . . through which they are in communication with the DTC via a fast tool bus FTB. This system is configured to handle data flows in opposite directions, i.e. from the tools, via the respective IPs and FTB, to the DTC and then to the DTM over the cable ("uplink"), and the reverse direction from the DTM to the DTC and tools over the same path ("downlink"). A principal object of the system is to provide a communication path from the tools to the surface so that data acquired by the tools in use can be processed and analyzed at the surface.

Because of the electrical limitations on a wireline cable, for example, the signal to noise ratio (SNR) can adversely impact the data rate. It would be desirable to provide systems and methods which overcome the signal to noise ratio (SNR) problems associated with borehole telemetry systems.

Figure 2A:
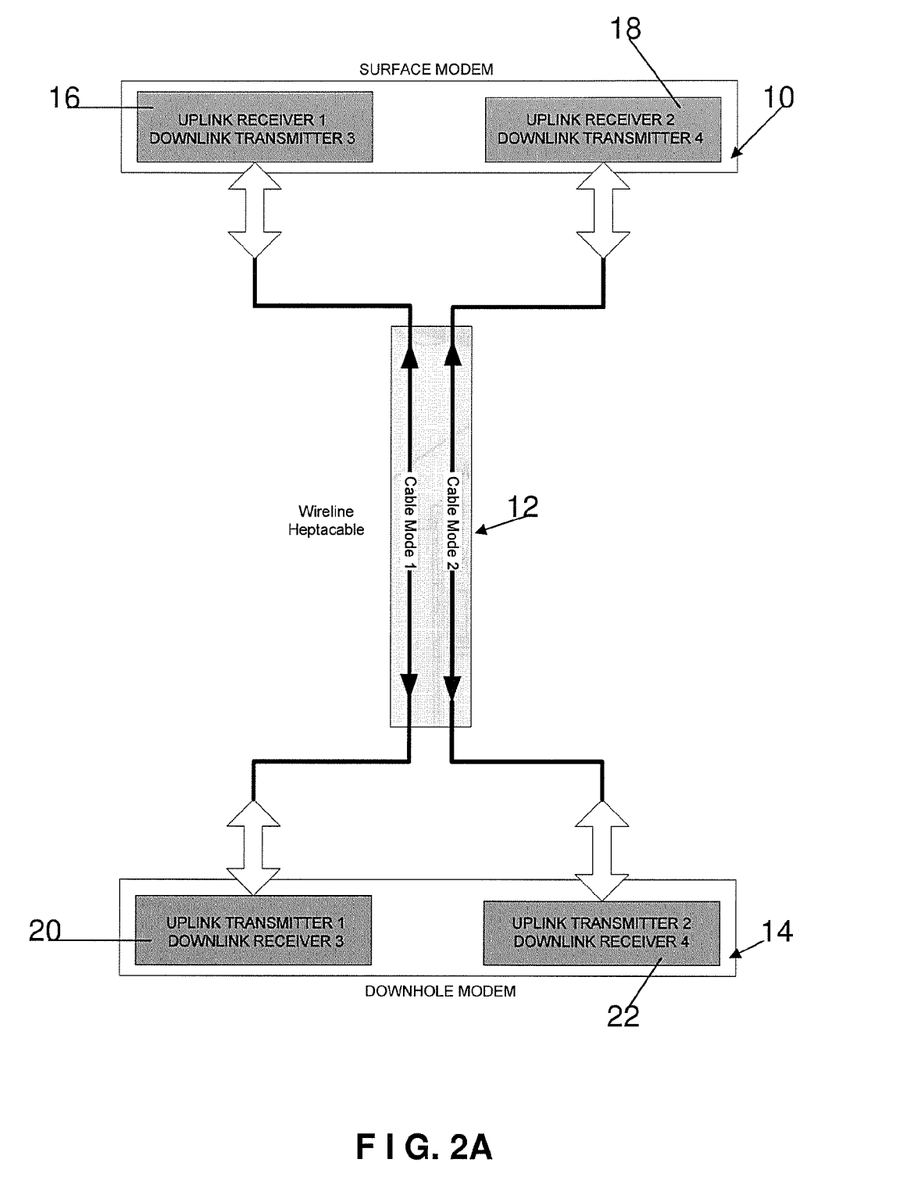
FIG. 2A is a schematic depiction of one exemplary configuration for downlink and uplink borehole telemetry.

FIG. 2A shows schematically one exemplary telemetry system in accordance with the present disclosure. The basic functional parts of the system comprise a surface telemetry module or modem 10, a cable 12 and a downhole telemetry cartridge or modem 14. The surface telemetry modem 10 is configured or designed for at least two data communication channels with a first channel having an uplink receiver and a downlink transmitter 16 and a second channel having an uplink receiver and a downlink transmitter 18 connected to the cable 12. The downhole telemetry cartridge 14 is likewise configured with the first channel having an uplink transmitter and a downlink receiver 20 and the second channel having an uplink transmitter and a downlink receiver 22 connected to the cable 12. In FIG. 2A, the system is configured for downlink and uplink data transfer. Although two channels are depicted in FIG. 2A, it is contemplated that additional channels also may be used for the purposes described herein.

In use, signals pass from the surface telemetry module 10 through two data communication channels, to the downhole telemetry cartridge 14 from which they are passed to the various tools in the tool string (not shown).

Figure 2B:
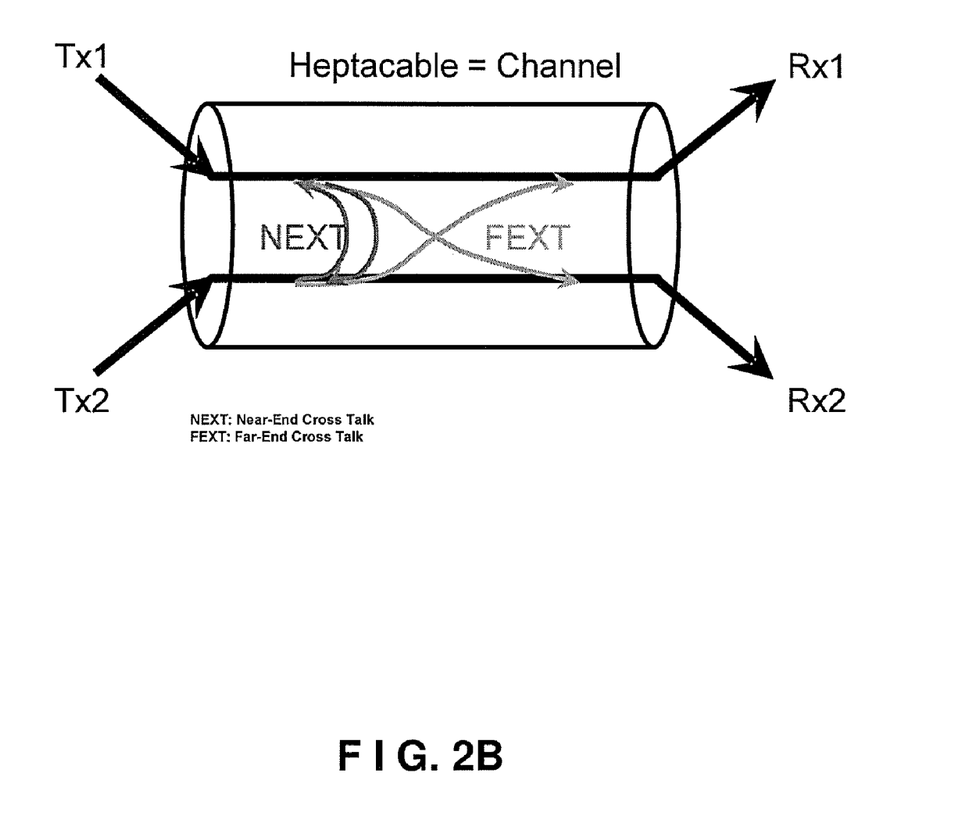
FIG. 2B is a schematic depiction of cross talk in a datalink utilizing two data communication channels in borehole telemetry.

FIG. 2B is a schematic depiction of near-end cross talk ("NEXT") and far-end cross talk ("FEXT") in borehole telemetry that result when data is telemetered in multiple channels of the same cable, such as two or more channels of a heptacable. As previously discussed, the present disclosure provides techniques for reducing the effects of cross talk by utilizing coding methodologies at the transmitter(s), located uphole and/or downhole, so that data that are transferred to corresponding receivers are received with increased or improved SNR. As described herein the increase or improvement to SNR of data that are transferred over multiple channels of the same cable refers to an increase or improvement in SNR that is achieved when compared with the SNR that is obtained with conventional borehole data telemetry techniques using multiple channels of the same cable.

Figure 3A:
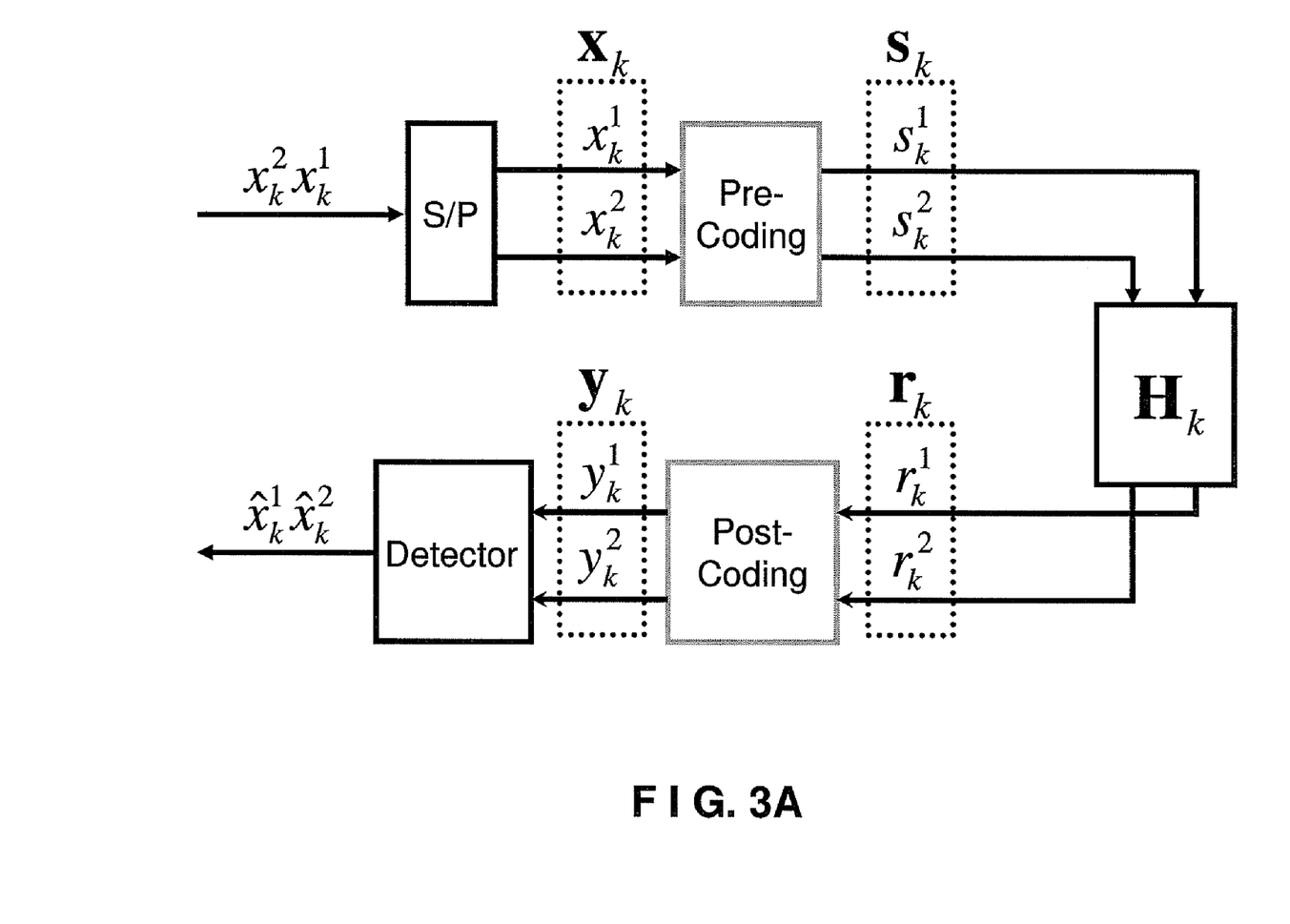
FIG. 3A is a schematic depiction of one possible configuration for data communication according to the principles described herein.
Figure 3B:
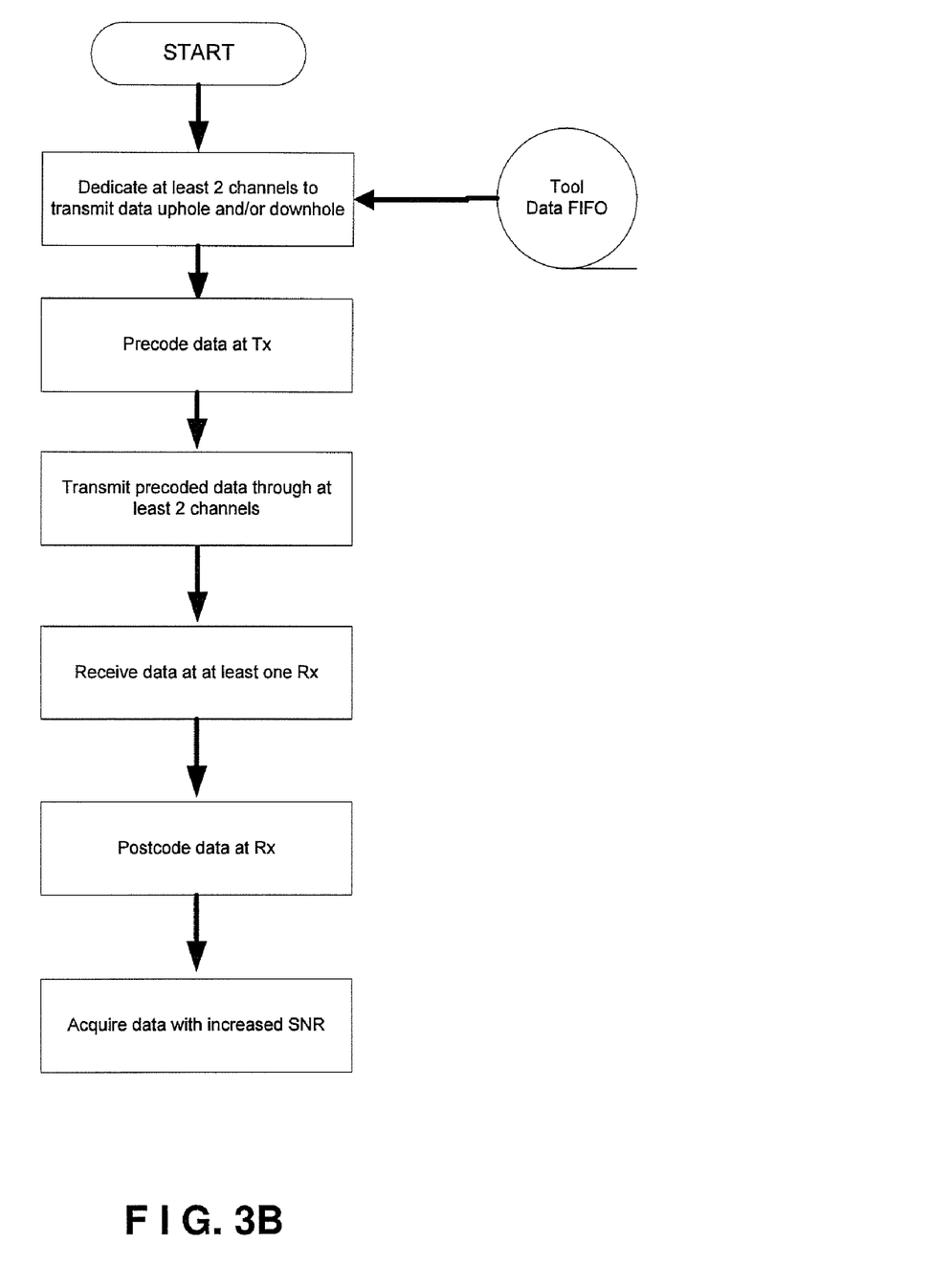
FIG. 3B is a flowchart of one possible method for data communication according to the present disclosure.

FIG. 3A shows schematically one possible configuration according to the present disclosure for improving the SNR of data that are transferred over at least two data communication channels. FIG. 3B is a flowchart depiction of one possible method according to the present disclosure. Tool data are processed in a serial to parallel converter (S/P) and then transferred via two communication lines. The data are coded, as described in more detail below, at the transmitter and the pre-coded data are transferred, via the two communication lines, to a corresponding receiver that includes a canceller for post-coding the received data and a detector for analyzing/processing the transferred data.

Applicant conducted simulation of the performances of different discrete multitone modulation ("DMT") systems including some of the systems described in the present disclosure. In the simulations, applicant compared a QR decomposition ("QRD") based system (also know as a vectored-DMT or V-DMT system) and a STBC based DMT system according to the present disclosure using different types of wireline cables. Applicant found that the STBC based DMT systems according to the present disclosure have an SNR improvement of about 6 dB for a target bit error ratio (BER) when compared with the conventional systems.

Discrete multitone modulation (DMT) is one technique that is used in modems for borehole wireline telemetry, such as broadband (or ADSL) modems. One technique for increasing data throughput is to use multi-input multi-output (MIMO) technology with DMT type modems. In wireless communications systems, MIMO technology combined with orthogonal frequency division multiplex (OFDM) scheme is used in communication systems to add diversity gain and to increase the system data throughput. In these MIMO based DMT systems, the propagation channel coefficients are estimated at the receiver and are used to remove far-end cross talk (FEXT) at the receiver.

Applicant recognized that space-time block coding (STBC) may be used as a coding method in borehole communication systems to exploit multi-path diversity over flat fading channels. The present disclosure contemplates the use of a channel coding technique such as the STBC method for MIMO DMT modems in borehole telemetry. Applicant recognized that by utilization of a channel coding technique it is possible to take advantage of path diversity as well as antenna (or space) diversity at the receiver and to add a coding gain to the system. Applicant discovered that STBC based MIMO DMT borehole telemetry systems have greatly improved data throughput with improved margins for signal to noise ratio (SNR). In general, for Nt different transmit antennas and Nr different receive antennas, the system disclosed herein achieves a Nt times Nr order of diversity. Applicant further noted that in DMT based modems using MIMO technology, propagation channel coefficients are estimated at the receiver. The coefficients are used to remove far-end cross talk (FEXT) at the receiver. Applicant recognized that techniques which improve the reliability of such data would also provide the ability to transmit data with increased SNR.

Applicant further recognized that STBC is a comparatively simple coding method that may be utilized with unexpected benefits for borehole telemetry systems over flat fading channels. For example, the transmitter may be implemented with 2-antennas and the receiver may have a single receiver antenna, i.e., multi-input single output (MISO) technology. It is envisioned that such techniques will improve the reliability of the communication system since two receiving paths improve the probability of error free reception of transmitted data over a fading channel. Similarly, STBC systems may be developed for MIMO systems to exploit the path and antenna diversity over a heavily attenuating channel.

Applicant has proposed a novel STBC based MIMO DMT type modem for use in borehole telemetry using, for example, wireline. It is contemplated that such systems will have a coding gain and path diversity at the receiver. In contrast with other techniques, it is envisioned that the proposed STBC based MIMO DMT systems will provide enhanced results. In the conventional MIMO DMT systems such as V-DMT, typically FEXT is considered as an interference and required to be removed from the desired signal. However, the proposed STBC based systems consider such FEXT interference as useful information and use it to exploit path diversity. Note FIG. 4B.

Figure 4A:
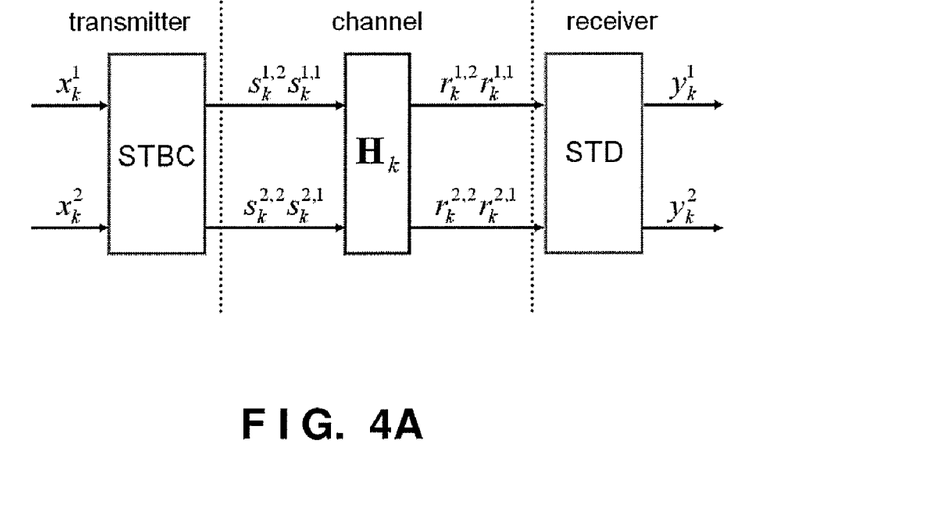
FIG. 4A is a schematic depiction of another possible configuration for data communication according to the principles described herein.

FIG. 4A schematically depicts one possible implementation of a STBC based borehole telemetry system using a 2×2 MIMO DMT configuration. Two data symbols are transmitted over two consecutive time periods, i.e., rate one. In a conventional DMT system, cable bandwidth W [Hz] is divided into K sub-carriers. FIG. 4A depicts the k-th sub-carrier, for k=1, . . . , K, of a STBC based MIMO DMT system according to the present disclosure. The STBC block in FIG. 4A performs space-time block coding on incoming symbols as given by:

$$s_k = \begin{bmatrix} s_k^{1,1} & s_k^{1,2} \\ s_k^{2,1} & s_k^{2,2} \end{bmatrix} = \begin{bmatrix} x_k^1 & -x_k^{2*} \\ x_k^2 & x_k^{1*} \end{bmatrix} \begin{array}{c} \rightarrow \\ \rightarrow \end{array} \text{cables} \quad \text{Equation 1}$$

where, $x_k^n$ denotes the n-th input data symbol to be transmitted on the k-th sub-carrier; and $s_k^{m,t}$ is the STBC symbol to be transmitted over m-th cable at the t-th time period.

Figure 4B:
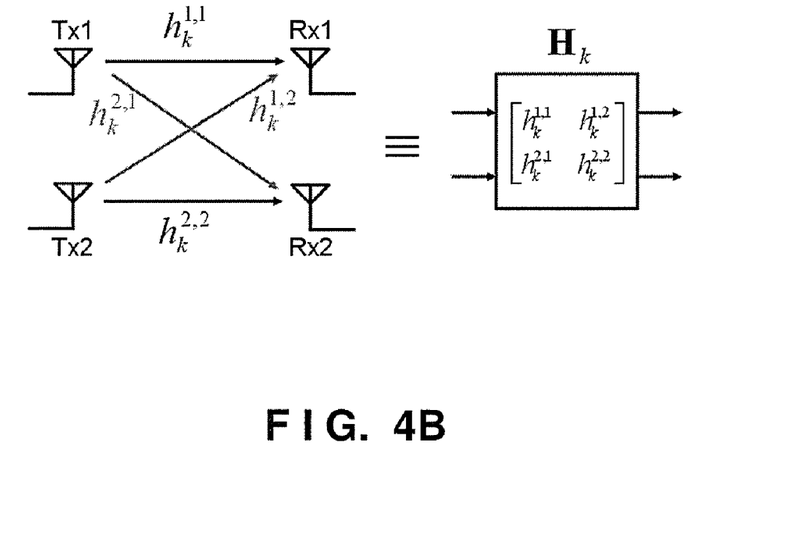
FIG. 4B is a schematic representation of one possible method of removing far-end cross talk according to the present disclosure.

FIG. 4B is a simplified depiction of a far-end cross talk (FEXT) channel model, where T×1 and T×2 indicate the input of STBC encoded symbols into two different cables. The propagated signals are received at R×1 and R×2 receivers. The dark cross lines represent FEXT interference coefficients to each cable. It is possible to decode the transmitted data at the receiver, and to obtain the two transmitted symbols by:

$$y_k^1 = h_k^{1,1*} r_k^{1,1} + h_k^{1,2} r_k^{1,2*} + h_k^{2,1*} r_k^{2,1} + h_k^{2,2} r_k^{2,2*} \quad \text{Equation 2}$$
$$= (|h_k^{1,1}|^2 + |h_k^{1,2}|^2 + |h_k^{2,1}|^2 + |h_k^{2,2}|^2) x_k^1$$

$$y_k^2 = h_k^{1,2*} r_k^{1,1} - h_k^{1,1} r_k^{1,2*} + h_k^{2,2*} r_k^{2,1} - h_k^{2,1} r_k^{2,2*}$$
$$= (|h_k^{1,1}|^2 + |h_k^{1,2}|^2 + |h_k^{2,1}|^2 + |h_k^{2,2}|^2) x_k^2$$

Equation 2 shows that transmitted signal symbols can be detected at the receiver. It is evident that the receiver does not require a decomposition algorithm for the channel matrix to remove the FEXT, but the square of estimated channel coefficients is summed to achieve a guaranteed gain in the system.

Figure 5:
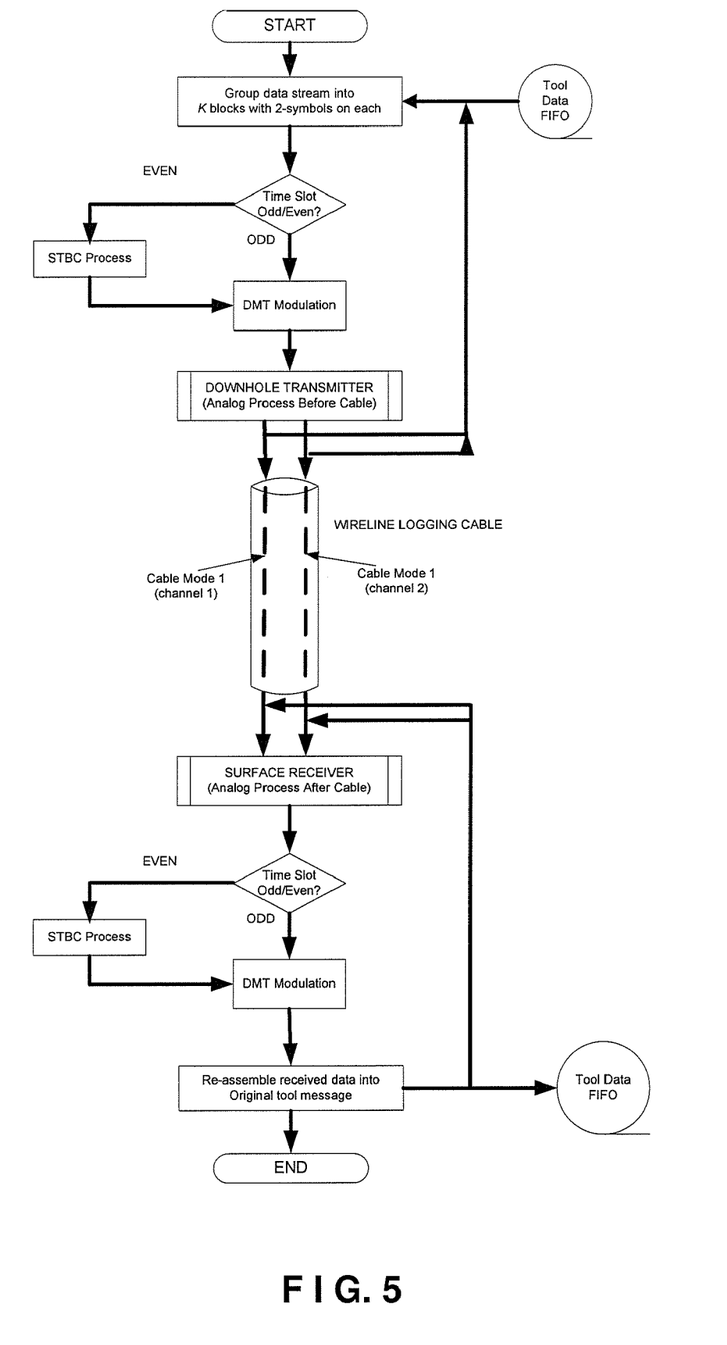
FIG. 5 is a flowchart of another possible method for data communication according to the present disclosure.

FIG. 5 is a flowchart depicting one possible data telemetry technique utilizing a STBC based DMT system according to the present disclosure. Data are received at a transceiver located at a surface modem and/or a downhole modem. Note again FIG. 2A. The data are processed at the transmitter as described above for transfer over at least two data communication channels. As shown in Equation 1 above, after determining whether the time slot is odd or even, the data are pre-coded using STBC coding described hereinafter. In this process, for the first (odd) time slot, the transmitter simply DMT modulates all the symbols in all the carriers and the data are sent via at least two channels of, for example, a wireline logging cable. Then, in the second (even) time slot, two symbols on each carrier are STBC processed, as explained in column two of the right-hand most matrix in Equation 1, followed by the DMT modulation. At the receiver, the data are acquired for two consecutive time slots, and post-coded using STBC data processing as described in Equation 2 above. The data are demodulated using conventional DMT data processing.

Figure 6A:
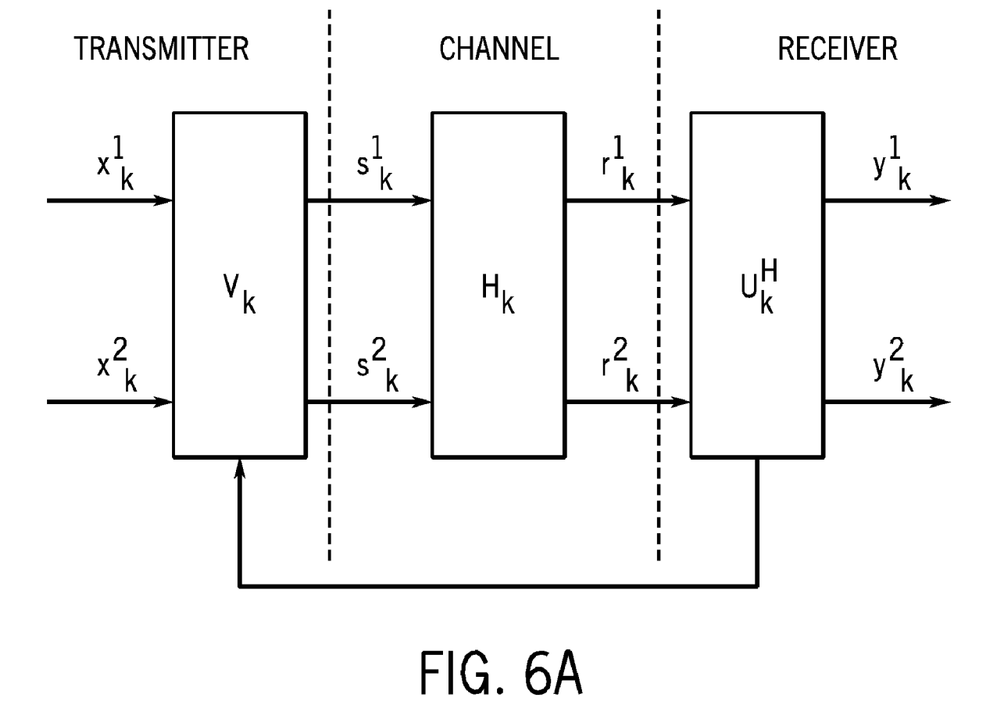
FIG. 6A is a schematic depiction of yet another configuration for data communication according to the principles described herein.
Figure 6B:
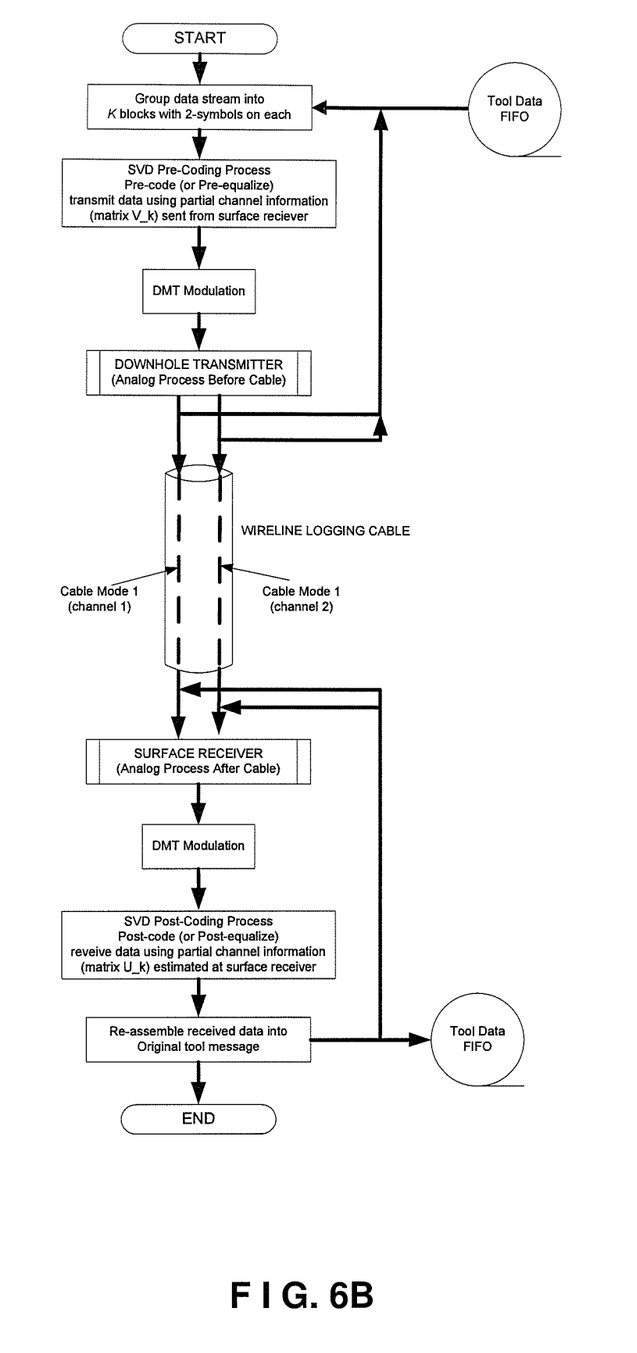
FIG. 6B is a flowchart of yet another method for data communication according to the present disclosure.

FIG. 6A is a schematic depiction of yet another configuration for data telemetry according to the present disclosure. FIG. 6B is a flowchart showing the steps for singular value decomposition (SVD) coding of data that are telemetered over at least two channels of a borehole telemetry system having a cable such as a heptacable.

In the SVD method, the transmitter is provided with appropriate propagation channel information as depicted by $V_k$ for k-th particular sub-carrier (note FIG. 6A). This information can be either sent from the receiver (as depicted in FIG. 6A) or estimated at the transmitter as the propagation channel or wireline cable is the same for both directions of transmission. Here, the propagation channel information is $H_k$ (note again FIG. 6A), which is decomposed to a multiplication of three matrices as given below.

$$H_k = U_k \Sigma_k V_k^H \quad \text{Equation 3}$$

Then, multiplying (or pre-coding) the transmitted data sequence $x_k$ by $V_k$ in the transmitter and the received signal sequence $r_k$ by $U_k^H$ in the receiver effectively removes the cross talk components, and the received signal can be expressed from the following equation:

$$y_k = U_k^H r_k \quad \text{Equation 4}$$
$$= U_k^H \left( U_k \sum_k V_k^H (V_k x_k) \right)$$
$$= \sum_k x_k$$
$$= \begin{bmatrix} \sigma_k^{1,1} & 0 \\ 0 & \sigma_k^{2,2} \end{bmatrix} \begin{bmatrix} x_k^1 \\ x_k^2 \end{bmatrix}$$

Then, an estimation of two transmitted signal sequences is expressed by:

$$\hat{x}_k^1 / \sigma_k^{1,1}, \hat{x}_k^2 = y_k^2 / \sigma_k^{2,2} \quad \text{Equation 5.}$$

The embodiments and aspects were chosen and described in order to best explain the principles of the invention and its practical applications. The preceding description is intended to enable others skilled in the art to best utilize the principles described herein in various embodiments and with various modifications as are suited to the particular use contemplated. It is intended that the scope of the invention be defined by the following claims.

What is claimed is:

1. A borehole telemetry system, comprising:
 a tool configured or designed for deployment in a borehole traversing a subterranean formation, the tool comprising a downhole telemetry module having at least a first transmitter and a first receiver;
 a surface telemetry module having at least a second transmitter and a second receiver; and
 a datalink between the downhole and surface modules configured or designed for transferring data over two or more data communication channels, wherein the system is configured or designed such that the transferred data is generated by space-time block coding at at least one of the first and second transmitter to increase the signal to noise ratio (SNR) of data received at a corresponding one of the first and second receiver.

2. The telemetry system of claim 1, wherein the datalink comprises a multi-input multi-output discrete multitone modulation system.

3. The telemetry system of claim 1, wherein the datalink transfers data between the surface and downhole modules via a wireline cable.

4. The telemetry system of claim 3, wherein the wireline cable comprises a 7 cable heptacable.

5. The telemetry system of claim 3, wherein the wireline cable also provides power to downhole tools.

6. The telemetry system of claim 1, wherein the downhole telemetry module is connected to at least one tool configured for making measurements while in the borehole, the datalink being configured or designed to pass data to and from the tool.

7. A tool configured for deployment at least one depth in a borehole traversing a subterranean formation, comprising:
a plurality of shuttles, comprising:
a plurality of downhole tools and at least one downhole telemetry cartridge, each downhole tool being configured or designed for data communication with the at least one downhole telemetry cartridge through an associated interface package, via a tool bus, wherein
the at least one downhole telemetry cartridge comprises:
at least one transmitter and one receiver;
the telemetry cartridge being configured or designed to transfer data over two or more data communication channels; and
the at least one transmitter being configured or designed to apply space-time block coding to the transferred data to increase the signal to noise ratio (SNR) of data received at an associated receiver.

8. A method for borehole telemetry, comprising:
deploying a tool at least one depth in a borehole traversing a subterranean formation, the tool comprising a downhole telemetry module;
transferring data over a datalink between the downhole telemetry module and a surface telemetry module, the datalink comprising two or more data communication channels;
space-time block coding the transferred data at at least one transmitter; and
receiving the coded data at a corresponding receiver, wherein
the coding reduces cross talk in the transferred data to increase the signal to noise ratio (SNR) of received data.

9. The method of claim 8, wherein the datalink comprises a multi-input multi-output discrete multitone modulation system.

10. A method for improving signal to noise ratio (SNR) in borehole telemetry, comprising:
transferring data over a datalink between a downhole telemetry module and a surface telemetry module, the datalink comprising two or more data communication channels;
space-time block coding the transferred data at at least one transmitter; and
receiving the coded data at a corresponding receiver, wherein
the coding reduces cross talk in the transferred data to increase the signal to noise ratio (SNR) of the received data.

* * * * *